United States Patent
Enbom et al.

(10) Patent No.: US 6,201,183 B1
(45) Date of Patent: Mar. 13, 2001

(54) SYSTEM ELECTROMAGNETIC WAVE-SHIELDING CHANNEL PARTS FOR FORMING OF AN ELECTROMAGNETIC WAVE-SHIELDING CHANNEL SYSTEM FOR ELECTRICAL CONDUCTORS AND A METHOD FOR THE MANUFACTURING OF THE PARTS IN THE SYSTEM

(75) Inventors: Rolf Enbom; Olov Anderson; Bernt Gidlund, all of Boden (SE)

(73) Assignee: Protec System AB, Boden (SE)

( * ) Notice: Subject to any disclaimer, the term of this patent is extended or adjusted under 35 U.S.C. 154(b) by 0 days.

(21) Appl. No.: 09/254,196

(22) PCT Filed: Jun. 25, 1997

(86) PCT No.: PCT/SE97/01140

§ 371 Date: Apr. 15, 1999

§ 102(e) Date: Apr. 15, 1999

(87) PCT Pub. No.: WO98/09358

PCT Pub. Date: Mar. 5, 1998

(30) Foreign Application Priority Data

Aug. 29, 1996 (SE) .................................................... 9603132

(51) Int. Cl.[7] ..................................................... H05K 9/00

(52) U.S. Cl. ........................ 174/35 R; 174/35 C; 174/64; 220/3.2; 264/171.12; 264/171.26

(58) Field of Search ................................ 174/35 R, 35 C, 174/35 GC, 51, 64, 48; 361/816, 818; 220/3.2; 264/3.3, 452, 464, 176.1, 171.13, 171.14, 177.1, 171.12, 171.26, 171.27, 104, 105

(56) References Cited

U.S. PATENT DOCUMENTS

| 4,508,640 | * | 4/1985 | Kanda et al. ........................ 252/503 |
| 5,004,561 | * | 4/1991 | Nomura et al. ..................... 252/511 |
| 5,068,493 | * | 11/1991 | Benn, Sr. et al. ............... 174/35 GC |

FOREIGN PATENT DOCUMENTS

0180383 * 10/1985 (EP) .

* cited by examiner

Primary Examiner—Kristine Kincaid
Assistant Examiner—W. David Walkenhorst
(74) Attorney, Agent, or Firm—John Lezdey & Assoc

(57) ABSTRACT

The invention provides a system of electromagnetic parts which form an electromagnetically shielded channel system for electric cables. Tubular parts are provided of a single piece structure, which are extruded from plastic materials and have several layers, including an inner layer of electrically insulating plastic material. There is at least one outer layer of electrically conductive material.

4 Claims, 1 Drawing Sheet

SYSTEM ELECTROMAGNETIC WAVE-SHIELDING CHANNEL PARTS FOR FORMING OF AN ELECTROMAGNETIC WAVE-SHIELDING CHANNEL SYSTEM FOR ELECTRICAL CONDUCTORS AND A METHOD FOR THE MANUFACTURING OF THE PARTS IN THE SYSTEM

FIELD OF THE INVENTION

The present invention relates to a system of electromagnetic shielding channel parts, including tubular parts, connecting or splicing sleeves, junction boxes having tubular connecting branches, which form an electromagnetically shielded channel system for electric cables, and also to a method of manufacturing said system components.

BACKGROUND OF THE INVENTION

Known electromagnetically shielded channel parts for forming a cable channel system in electrical installations are normally based on some electrically insulated thermoplastic material that is covered externally with a coating of electrically conductive metallic film, preferably by vacuum sputtering. The metallic film is, as a rule, connected electrically to earth with the intention of enhancing the shielding effect of the system comprised of said channel parts. Such channel parts are known from JP 513 72 for instance.

One drawback with these channel parts is that the metal coating on the plastic material tends to loosen as the channel parts are handled and during their transportation. In addition to the method being expensive in practice, it is also difficult when practicing the method to metallize the inner surfaces of the connection branches of junction boxes so effectively as to be able to guarantee the requisite electrical connection between the metal coating on the outside of, e.g, a tubular part of the system and the metallic coating on the inside of the connection branch pipe when the tubular part is received in the connection branch pipe. It is therefore necessary to arrange separate connection couplings between said parts in order to achieve the requisite electrical connection between the mutually connected parts of the system.

It has been found, however, that plastic materials that are conductive electrically shield alternating electrical fields very effectively, when earthed electrically. The plastic materials are normally made electrically conductivity admixing an electrically conductive material with the plastic, such as carbon fibre graphite, or carbon black for instance. Electromagnetically shielding compositions are well known to the art and described exhaustively in U.S. Pat. No. 5,004,561 for example.

The object of the present invention is to provide a system of electromagnetically shielding channel parts, including tubular parts, jointing or splicing sleeves, junction boxes having tubular connecting branches, for forming an electromagnetic wave- shielding channel system for electric cables, with which the aforesaid drawbacks are avoided and the channel parts can be produced more easily than the earlier known parts.

The publication U.S. Pat. No. 4,508,640 teaches electromagnetically shielding material that consists of several layers of mutually different electrical conductivity. Despite this document, similar to the aforegoing, giving an exhaustive report of the problems associated with electromagnetically shielding materials in the form of externally metallized thermoplastics for use in a cable channeling system the type of layered parts and components to which the present invention refers are neither mentioned nor inferred. In clear distinction to the principles on which the present invention is based, according to which an electrically insulating layer is applied to the inner surface of respective parts, the document proposes the application of an electrically insulating layer on parts and components manufactured from electrically conductive materials with the intention of enhancing safety when handling the parts.

SUMMARY OF THE INVENTION

The object of the present invention is achieved with a system of electromagnetically shielding parts that have the features set forth in the accompanying claims.

The inventive features of the system afford many significant advantages over known techniques.

For one thing electromagnetic channel parts can be produced in a simple and favourable manner from the aspect of cost, by extruding or pressing said parts directly from plastic material. For another, the parts produced in accordance with the invention are insensitive to the knocks and blows suffered when handled and transported. Furthermore, such parts made of plastic material are light in weight and can readily be given the colour desired. Neither do the branched connection boxes require a separate electrical connection between itself and the branch-accommodated tubular part, since the requisite electrical connection is obtained by the direct surface contact of the inner surface of the branch pipe on the connection box and the outer surface of the tubular part.

BRIEF DESCRIPTION OF THE DRAWINGS

The invention will now be described with reference to an exemplifying embodiment thereof and also with reference to the accompanying drawing, in which.

DESCRIPTION OF THE PREFERRED EMBODIMENTS

Figure 1:
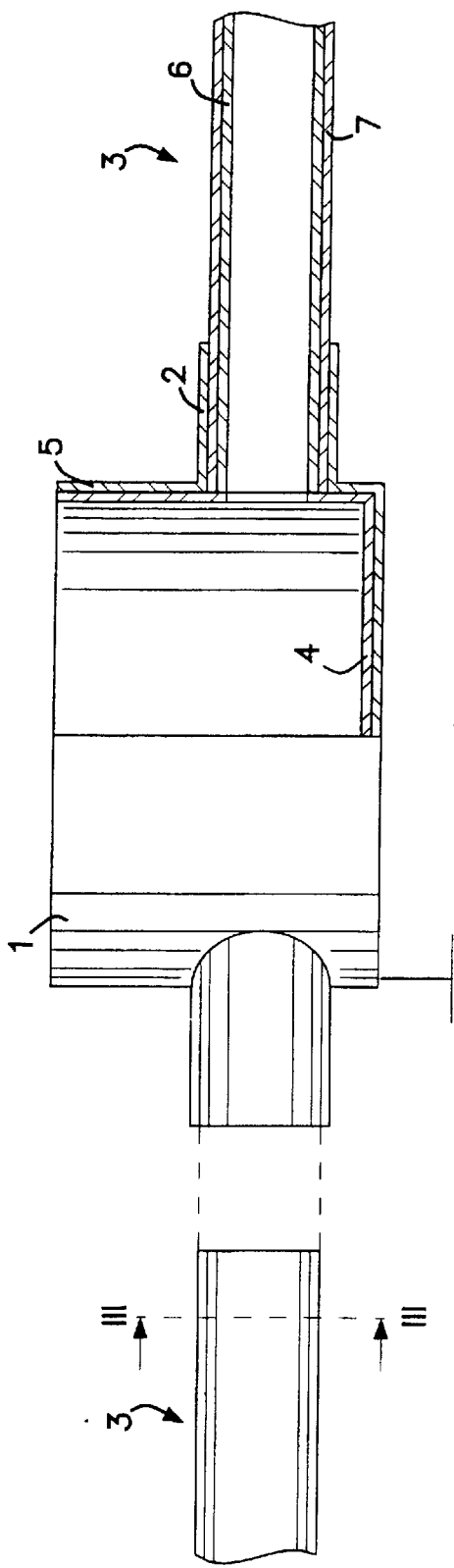
FIG. 1 is a side view, partially in longitudinal section, of an electromagnetically shielded, branched connecting box and similarly shielded tubular parts connected thereto, said parts being formed in accordance with the inventive principles.

Shown in FIG. 1 is a connection box 1 or junction box that includes on its periphery branch pipes 2 which accommodate tubular parts 3 for receiving electric cables, not shown. The connection box 1 is produced in a known manner with the aid of conventional machines as an injection moulded element that includes two layers, in form of an inner layer 4 and an outer layer 5, respectively. The outer layer 5 is comprised of a known injection mouldable electrically conductive plastic material which is injection moulded to a shape that forms both the outer layer 5 and also the connection branch pipes 2 of the box 1. The inner layer 4 is produced from a known electrically insulating plastic material and, as shown in FIG. 1, is embedded in the cavity of the outer layer 5 by a subsequent re-extrusion of the outer layer 5.

The tubular parts 3 are comprised of an inner layer of electrically insulating plastic material and an outer layer 7 of an electrically conductive plastic material, preferably of the same kind as that used to produce the outer layer 5 on the connection box 1. The tubular parts 3 are preferably produced in a single two-layer piece by means of a co-extrusion method.

A close study of the longitudinally sectioned part of FIG. 1 will reveal that the outer layer 7 of the tubular part 3 and the outer layer 5 of the connection box 1 are connected electrically when the end of the tubular part 3 is located in the branch pipe 2 of the connection box 1.

Figure 2:
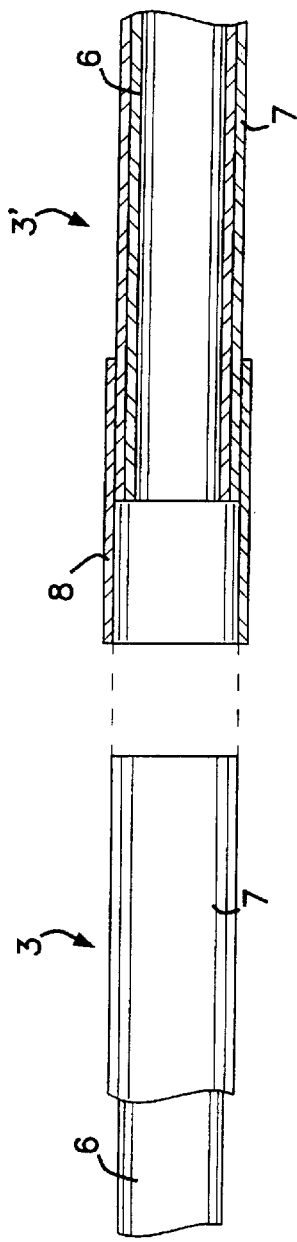
FIG. 2 is a side view, partly in longitudinal section, of an electromagnetically shielded connecting sleeve and tubular parts formed in accordance with the inventive principles received therein.

FIG. 2 illustrates a connecting sleeve or splicing sleeve 8 which forms part of said system 10 and which is used to join together two tubular parts 3, 3' whose respective ends are received in said sleeve. These tubular parts 3, 3' will not be described in detail, however, since they correspond to the aforedescribed tubular parts in all essentials. The connecting sleeve 8, however, differs from the above mention layered parts, in that the sleeve is produced exclusively from an electrically conductive plastic material. This enables the outer layers 7 and 7' of respective tubular parts 3 and 3' to be connected electrically to one another when the ends of the tubular parts 3, 3' are inserted into the sleeve 8.

Figure 3:
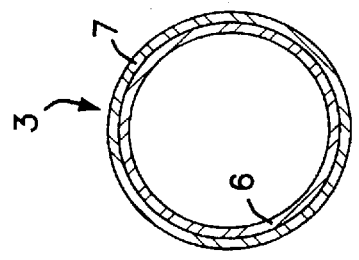
FIG. 3 is a cross-sectional view of a tubular part, taken on the line III—III in FIG. 1.

FIG. 3 is a cross-sectional view of the tubular part 3 and is intended to illustrate further the construction of the tubular part of the inventive system and its inner layer 6, and outer layer 7 formed in one piece.

It will be understood that the invention is not restricted to the described and illustrated embodiments thereof and that changes and modifications can be made within the scope of the inventive concept as defined in the following claims. For instance, it is conceivable for the layers of electrically conductive material included in parts of the inventive system and described above to typically comprise several layers of mutually differing degrees of conductivity. It will also be understood that the term channel part as used here is very generalized and that is includes all parts and components known by the skilled person to be included in a traditional electric cable channeling system.

What is claimed is:

1. In a system of electromagnetic wave-shielding channel parts, including tubular parts, connecting sleeves, junction boxes having tubular connecting branch pipes, which form an electro-magnetically shielded channel system for electric cables, the improvement which comprises that the tubular parts are comprised of a single-piece structure which is extruded from plastic material and each part has several layers, including an inner layer consisting of an electrically insulating plastic material and at least one outer layer consisting of an electrically conductive plastic material; in that the connecting sleeves are single-piece structures made of an electrically conductive plastic material and including at least one layer; and in that the junction boxes are made from a thermoplastic material and comprise several layers that include an inner layer of electrically insulating material and at least one outer layer of electrically conductive plastic material, wherein the branch pipes on said junction boxes form part of the outer layer.

2. The method of producing electromagnetically shielding channel parts included in the system according to claim 1, which comprises extruding the tubular parts in several layers with the use of said electrically insulating plastic material for the inner layer and said electrically conductive plastic material for each outer layer.

3. The method of producing electromagnetically shielding channel parts included in the system according to claim 1, which comprises extruding the tubular parts from said electrically conductive plastic material in at least one layer.

4. In a method of producing electromagnetically shielding channel parts included in the system according to claim 1, the improvement which comprises that the junction boxes are produced by extruding said outer casing from an electrically conductive plastic material in said at least one outer layer, said branches forming a part of said at least one outer layer, and in that the outer casing is re-extruded so as to form an inner casing of electrically insulating plastic material embedded in the cavities of said re-extruded outer casing.

* * * * *